Figure 1A:
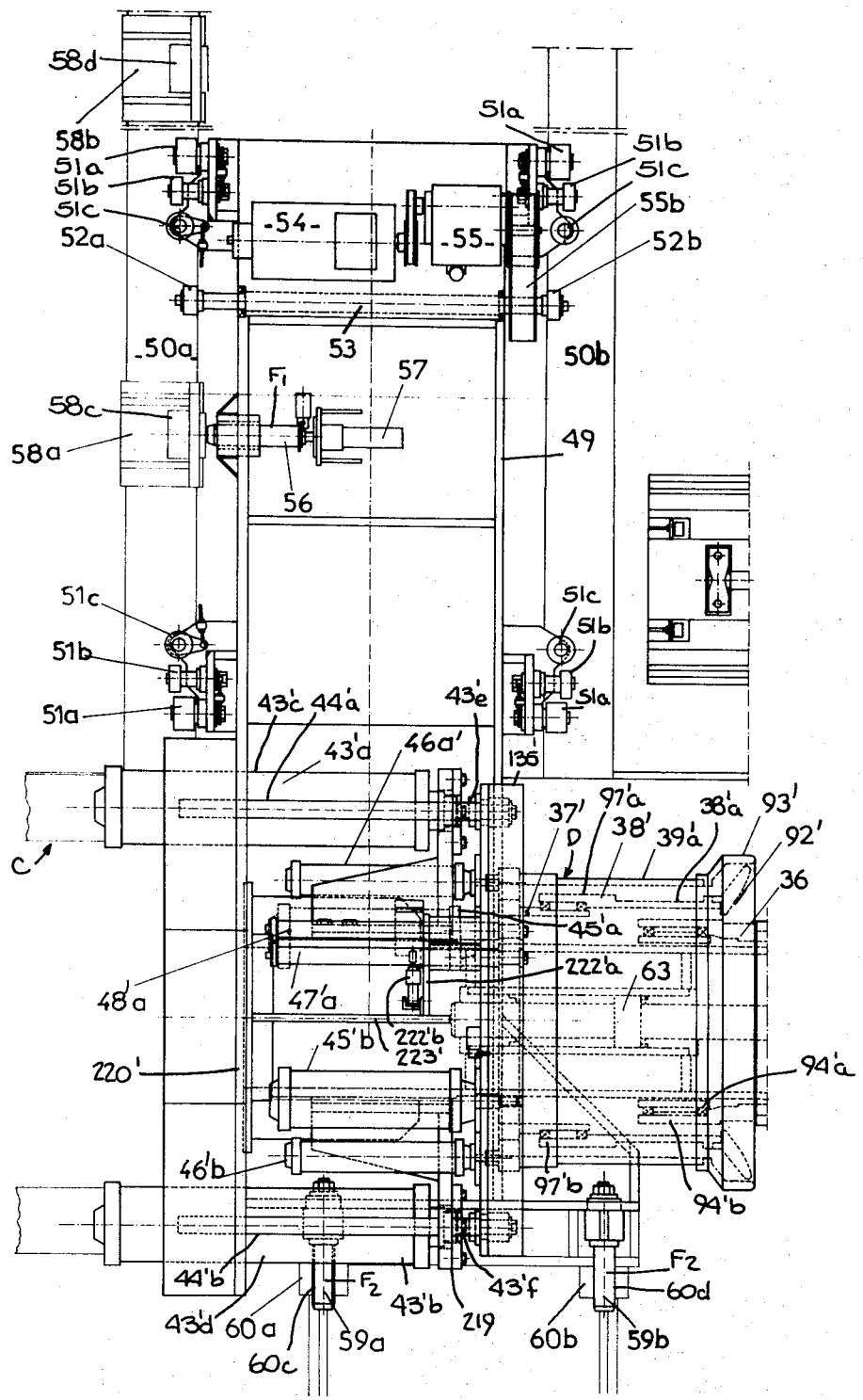

United States Patent [19]

Leblond et al.

[11] 3,873,397

[45] Mar. 25, 1975

[54] TIRE BUILDING APPARATUS

[75] Inventors: Jean Rene Leblond; Guy Emile Danneels; Jean Armand Biet, all of Compiegne, France

[73] Assignee: Uniroyal a Societe Anonyme, Clairoix, Oise, France

[22] Filed: July 6, 1972

[21] Appl. No.: 269,341

[30] Foreign Application Priority Data
July 13, 1971 France .............................. 71.25784

[52] U.S. Cl. ................. 156/401, 156/132, 156/398, 156/400, 156/415, 156/417
[51] Int. Cl. ...................... B29h 17/22, B29h 17/24
[58] Field of Search ........... 156/110, 116, 123, 126, 156/127, 128, 131, 132, 133, 135, 398, 400, 401, 402, 403, 414–421

[56] References Cited
UNITED STATES PATENTS

| | | | |
|---|---|---|---|
| 1,562,754 | 11/1925 | Gautier | 156/394 |
| 2,313,035 | 3/1943 | Breth | 156/403 |
| 2,628,652 | 2/1953 | Orr | 156/128 |
| 2,814,330 | 11/1957 | Vanzo et al. | 156/414 |
| 3,184,361 | 5/1965 | Allitt | 156/415 |
| 3,433,695 | 3/1969 | Caretta et al. | 156/415 |
| 3,489,634 | 1/1970 | Pizzo et al. | 156/415 |
| 3,582,435 | 6/1971 | Frazier | 156/417 |
| 3,718,520 | 2/1973 | Leblond | 156/417 |
| 3,740,292 | 4/1968 | Leblond | 156/133 |
| 3,740,293 | 6/1973 | Jones et al. | 156/415 |

OTHER PUBLICATIONS
Webster's Seventh New Collegiate Dictionary, 1967, by G. & C. Merriam Co., p. 346, Pub. Springfield, Mass.

*Primary Examiner*—Clifton B. Cosby
*Assistant Examiner*—John E. Kittle
*Attorney, Agent, or Firm*—Jay L. Chaskin, Esq.

[57] ABSTRACT

An apparatus and method in which a radially and axially expandable and contractable tire building drum is used in a single-stage building of a pneumatic tire carcass, particularly tire carcasses for heavy service. The essential parts of the tire are applied and the manufacturing steps are accomplished without transferring or removing the tire carcass from the drum upon which it is built. The essential parts and steps including applying the carcass layers, positioning of the bead wire rings, turning the marginal edges around the bead wire rings, rolling and stitching, shaping the carcass into the toroidal configuration, applying, rolling and stitching of a reinforcing belt and a tread and application and shaping of the sidewalls. Shaping of the carcass into the toroidal configuration is accomplished by pneumatic pressure being applied between the carcass and the building drum.

24 Claims, 12 Drawing Figures

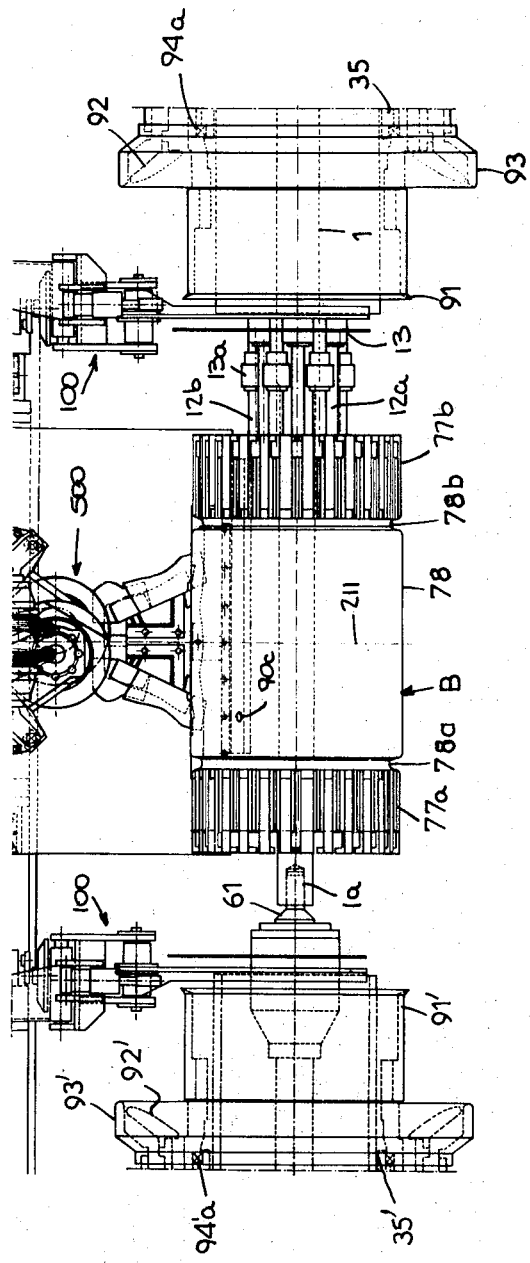

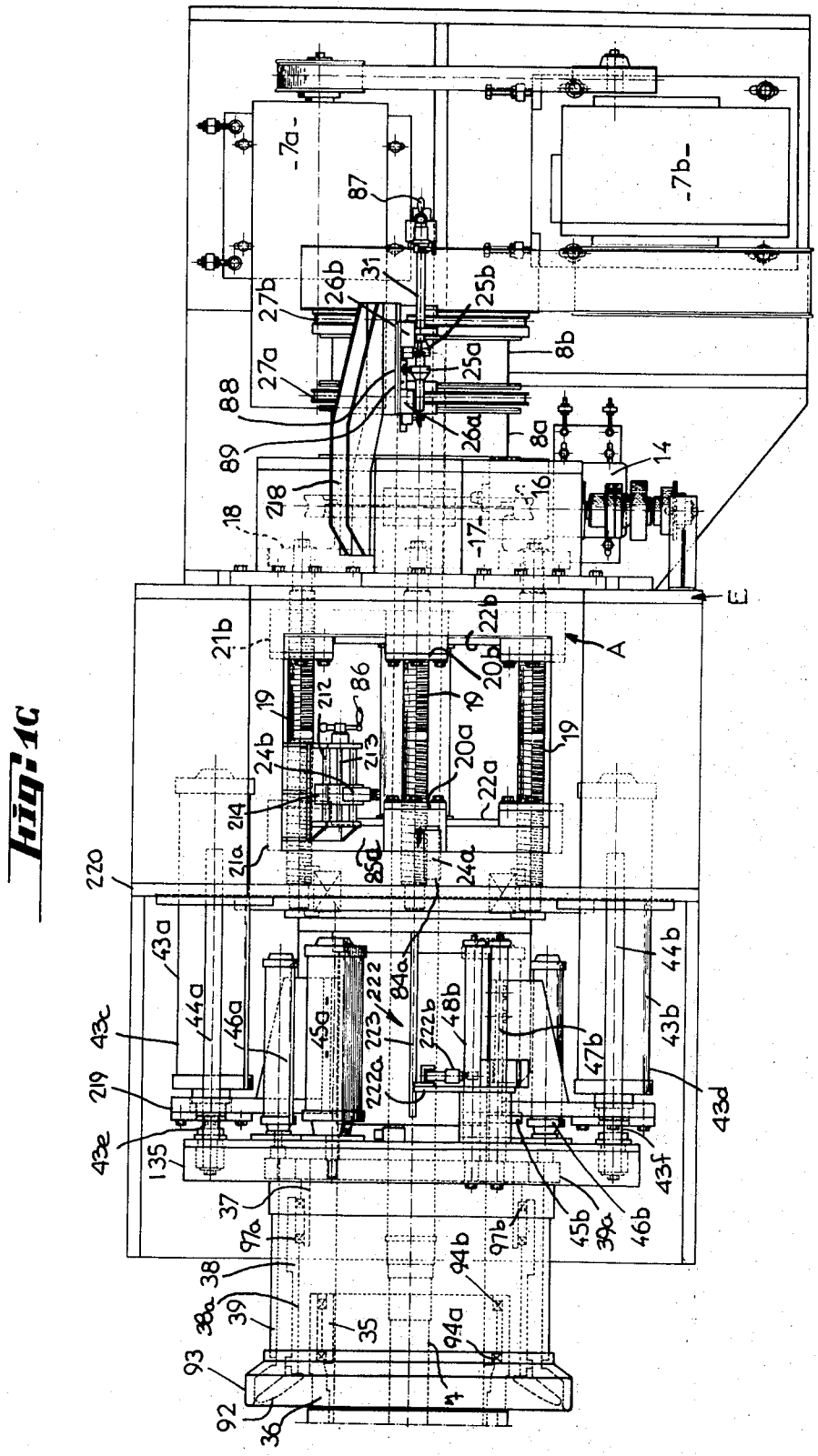

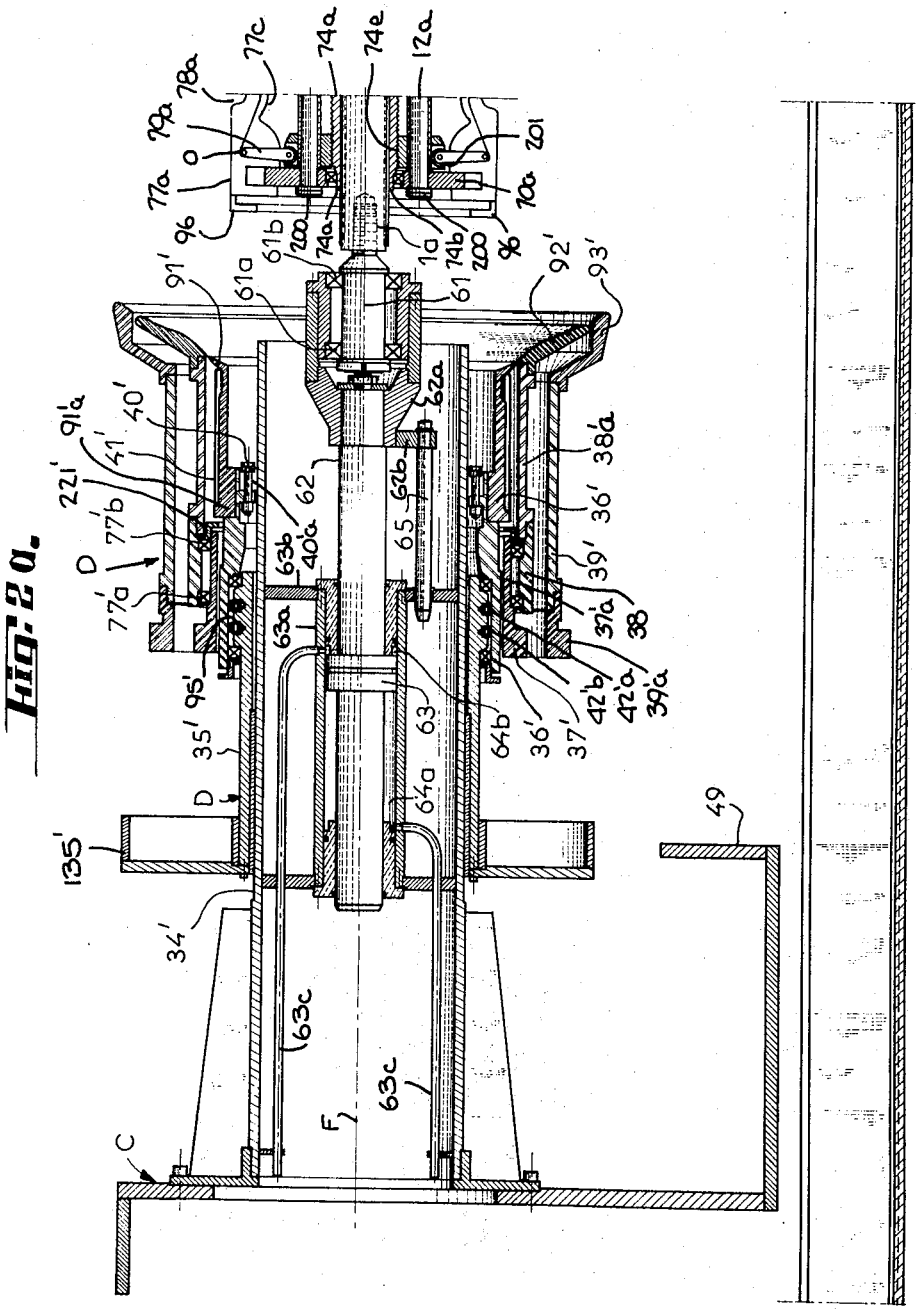

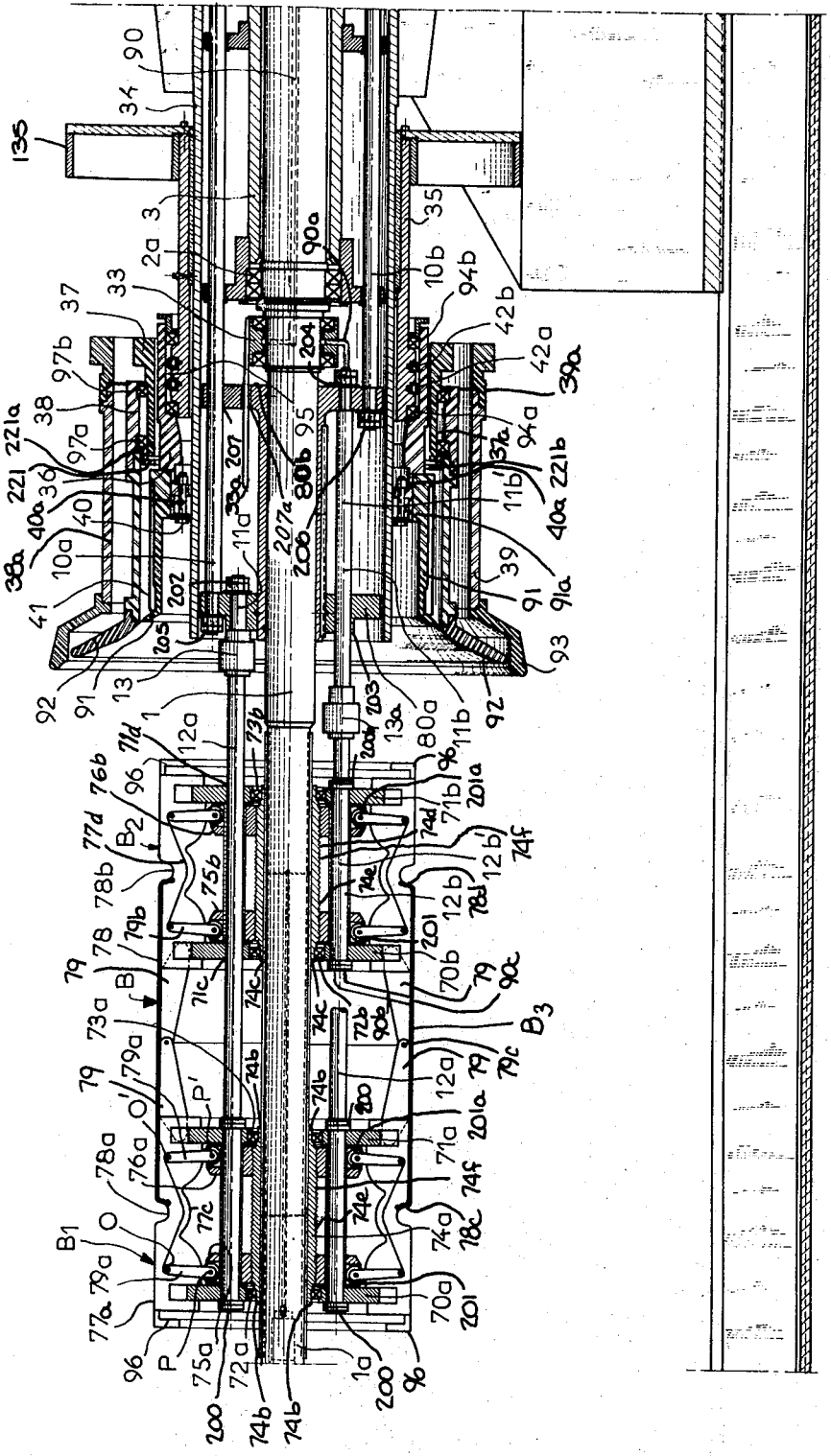

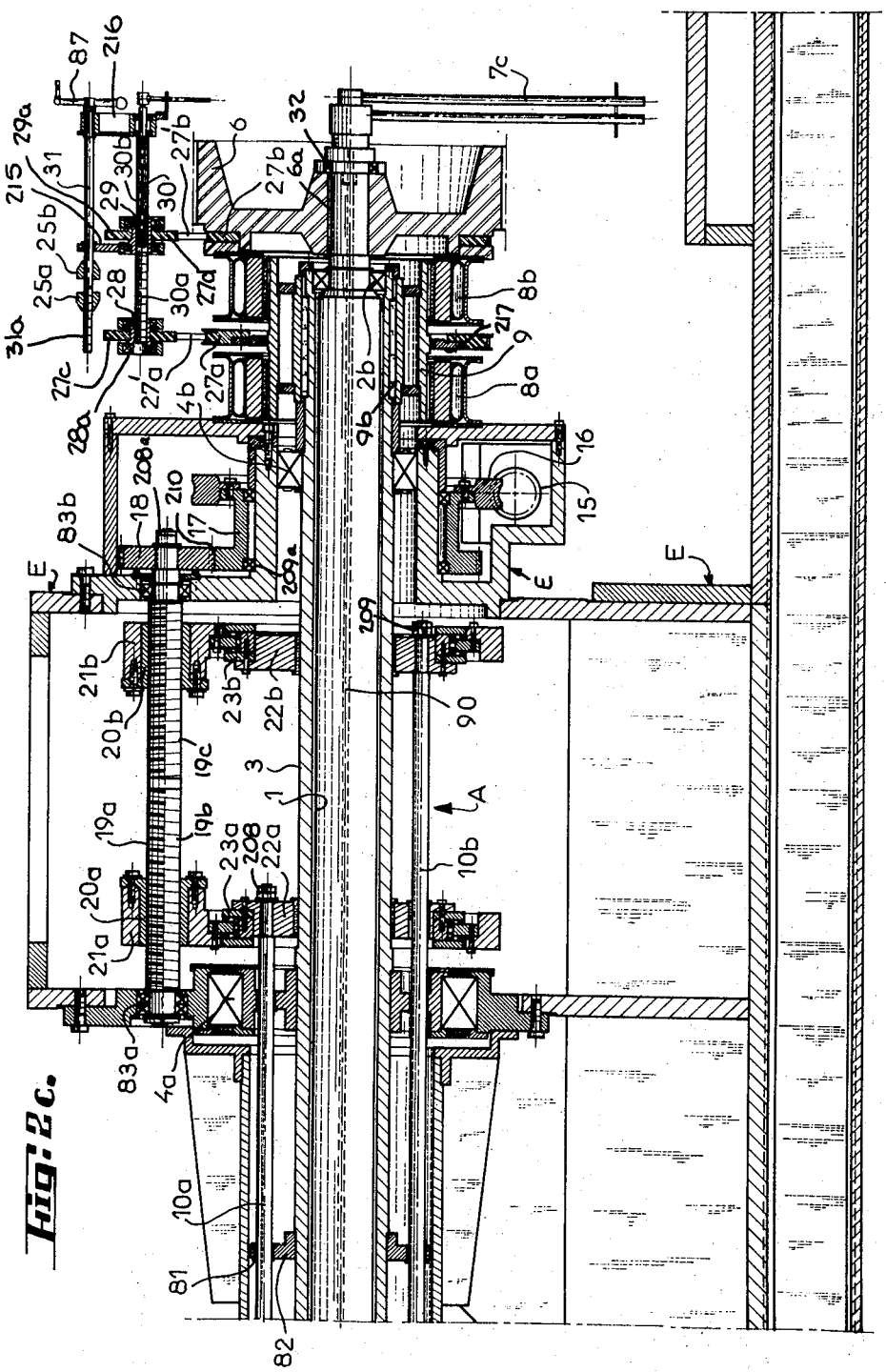

TIRE BUILDING APPARATUS

This invention is directed to an apparatus and method for manufacturing a pneumatic tire carcass. More particularly to an apparatus and method in which a radially and axially expandable and contractable tire-building drum is used in a single-stage building of a tire carcass, specifically tire carcasses for heavy service. A typical tire building drum suitable for use with the present invention is disclosed in U.S. Pat. No. 3,718,520, assigned to the assignee of the present invention.

An accepted apparatus and method for manufacturing pneumatic tire carcasses comprises applying different carcass layers or plies onto tire-building drums thereby building a cylindrical carcass according to the "flat-building" technique. In building each carcass, the method includes the step of transferring the cylindrical carcass from a first tire-building drum to a second tire-building drum. A method which uses two tire-building drums is referred to as a "two-cycle" or two stage method.

A considerable disadvantage and shortcoming of the two-stage method is the occurrence of detrimental deformations to the carcass during the transfer from the first to the second building drums. Moreover, distortions occur during shaping or forming of the carcass into the toroidal configuration because of the shifting and rotation of the carcass, especially in the carcass layers turned about the bead wire rings. According to the accepted two-stage tire building apparatus and method, shaping of the carcass into the toroidal configuration is performed by an inflatable and expandable bladder. Pneumatic pressure is admitted into the bladder and the bladder expands against the inner surface of the carcass to form the toroidal configuration. The expanding bladder rubs against the inner surface of the carcass and tends to distort the carcass, especially tending to shift the innermost carcass layer relative to the further carcass layers and at the area where the layers are turned around the beads. Such distortions and layer shifting does not permit a satisfactory tire to be built.

The apparatus and method of this invention avoids carcass distortions and ply layer shifting by building the complete tire carcass on a single tire-building drum without any transfer of the partially completed carcass to a second tire-building drum. All of the essential parts of the tire and the manufacturing steps, including applying the carcass layers, positioning of the bead wire rings, turning the marginal edges of the carcass layers around bead wires, rolling and stitching, shaping the carcass into the toroidal configuration, application, rolling and stitching of the reinforcing belt and the tread, and application and shaping of the sidewalls.

In accordance with this invention, inflation of the carcass during shaping is accomplished by admitting pneumatic pressure between the flaat carcass and a membrane supported by the outer lateral surface of the tire-building drum. The inner surface of the carcass and the membrance form an airtight annular chamber. Toroidal shaping is accomplished by applying directly pneumatic pressure against the carcass and any distortion of the carcass by a rubbing membrance is thus prevented.

The reinforcing belt and tread is guided to a position which circumferentially surrounds the periphery of the flat carcass before inflating the bladder. Building and positioning of the reinforcing belt and tread is accomplished by a known apparatus but preferably is an apparatus of the type described in U.S. Pats. Nos. 3,674,603 and 3,740,292, each assigned to the assignee of the present invention. The reinforcing belt and tread can also be applied manually to the carcass after the bladder has been inflated whereby the shaped carcass is always supported by the same tire-building drum.

The tire-carcass building apparatus according to the disclosed invention includes a drive unit which rotates and supports a main shaft. Supported at one end of the main shaft is a tire-carcass building drum which is radially and axially expandable and contractable. The drive unit includes means for radially and axially expanding and contracting the tire-building drum, as well as means for shaping one side of the carcass. A retractable detachable mechanical unit is located at and supports the other end of the main shaft and is axially opposite the drive unit. The mechanical unit includes means for shaping the other side of the carcass. The tire building apparatus further includes means for guiding and positioning the bead wires and either manual or automatic means for guiding and positioning the reinforcing belt and tread and means for rolling and stitching the carcass ply layers, sidewalls and the belt and tread. According to the preferred embodiment of the invention, the means for shaping the sides of the carcass includes means for applying the corresponding sidewall onto the carcass. Further according to the preferred embodiment of this invention, the drive unit includes a casing rotatably supported by a frame by means of bearings.

The main shaft is rotatably supported by the casing by means of bearings. The support casing includes at least two sets of longitudinal guide rods which rotate together with the support casing and thereby rotates the tire building drum. The guide rods sets are also capable of moving axially in respective opposite directions for axially expanding or contracting the tire-building drum. Each set of rods is supported by respective plates transverse to the main shaft. The plates are disposed along the axial length of the main shaft and partially form the structure of the tire-building drum. The drive unit further includes means for radially expanding and contracting the tire-building drum by rotating the main shaft and simultaneously preventing the rotation of the support casing. The drive unit further comprises a ring support casing which can axially slide relative to the frame. The ring support casing comprises an inner ring, a middle ring and an outer ring mounted on ferrules and ring supports that are centrally cylindrical and concentric with the ring-support casing. The inner, middle and outer rings, respectively, cooperate with each other and the other elements of the disclosed apparatus in shaping the carcass.

According to preferred embodiment, the detachable mechanical unit comprises a carriage and a counterpoint support and shaping unit carried by the carriage. The mechanical unit is provided with pins for centering the unit on the frame in at least two perpendicular directions. The counterpoint support and shaping unit has a counterpoint whose configuration allows it to re-center and support one end of the main shaft which axially extends from the tire-building drum on the side opposite the drive unit.

Other purposes, characteristics, and advantages of this invention will appear during the following description with reference to the attached drawings in which:

FIG. 1, which consists of FIGS. 1a to 1c when placed end to end, represents a partially sectional top view of an apparatus for building a tire carcass according to the preferred embodiment of this invention;

FIG. 2, which consists of FIGS. 2a to 2c when placed end to end, represents a partially sectional axial vertical cross-section, i.e., a longitudinal view of the tire building apparatus, according to line II—II in FIG. 1;

FIGS. 3a to 3f represent partial sectional and schematic views that illustrate the main stages in the method of this invention.

By simultaneously referring to FIGS. 1 and 2, the apparatus according to the present invention includes a drive unit A supported by a frame E; a radially and axially expandable and contractable tire-building drum B disposed at one end of unit A; and a detachably removable mechanical unit C which supports a counterpoint support and shaping unit D located on the opposite side of the drive unit A with respect to the tire-building drum B.

FIG. 1 further shows an apparatus 100 for gripping wire tire beads 99 (FIG. 3) and positioning the beads within the annular grooves 78a and 78b of the tire-building drum B. Apparatus 100 cooperates with the present invention in avoiding and preventing carcass distortion and shifting. Apparatus 100 may be of any known type but preferably is the type described in copending patent application Ser. No. 265,876 filed June 23, 1972, assigned to the assignee of the present invention. In particular, apparatus 100, as described in the foregoing copending Patent application has means for gripping wire tire beads 99 (FIG. 3a) including electromagnets for magnetically attracting and holding the beads. In such an appartus means are provided for moving said gripping means separately and simultaneously both perpendicular and parallel to the axis of rotation of the building drum to position the gripping means in the final location of the bead wire rings to dispose the beads within the grooves of the rotary tire-building drum on which the tire carcass is formed.

In the method of the disclosed invention, as described in copending patent application Ser. No. 265,876, after the several carcass layers have been applied to the drum the bead wires are positioned adjacent to the anular bead receiving grooves of the drum. The bead rings are positioned coaxial with the tire-building drum and radially spaced from the carcass layers on the drum. The bead wire rings are also disposed slightly axially outward of the bead receiving annular groove. The radial expansion of the drum causes the bead wire rings to be seated into the grooves and embedded in the carcass layers. As used herein, the term carcass layer refers to a cord reinforced ply of a pneumatic tire. The term cord as used herein, refers to cords, cables, filaments and wires, whether single or multiple strand and whether twisted together in any combination. The material for such cord reinforcement may be a natural or synthetic textile, glass or metal. FIG. 1 further shows an apparatus 500 for rolling and stitching the various component layers of the tire; such layers to include the carcass plies, the sidewalls, a breaker or belt, if any, and the tire tread. Apparatus 500 may be of any known type but preferably is of the type described in copending patent application Ser. No. 265,927, filed June 23, 1972, assigned to the assignee of the present invention. In particular apparatus 500, as described in the foregoing for copending application is a substantially completely mechanical tire stitching apparatus comprising a stitching roller; first mechanical cam-controlled guiding means for individually and positively guiding the roller along a predetermined path on a tire surface to be rolled and stitched at a predetermined depth of penetration of the roller into said tire surface; and second mechanical cam-controlled guiding means for continuously orienting the roller at a substantially normal angle of incidence relative to said tire surface as the roller is guided thereover by the first mechanical guiding means.

Drive unit A, to be described in detail, performs the following two functions. First, it supports and controls the tire-building drum B by providing actuating movements and controlling these movements and second, it is equipped with the means for shaping the right side of the carcass (relative to the plane in FIGS. 1 and 2) and provides the means for advancing and returning the shaping rings.

Tire-building drum B is supported by a main shaft 1 of the drive unit A and extends in a longitudinal direction F. Shaft 1 is axially supported on one end by a paired bearing 2a and on the other end by bearing 2b. The outer housings of bearings 2a, 2b are mounted in a support casing 3, which casing is attached to a stationary frame E by means of bearings 4a and 4b. Shaft 1 can freely rotate relative to the support casing 3, and the casing 3 can freely rotate with respect to the frame E. Shaft 1 and the support casing 3, however, are positioned axially relative to said frame E. Shaft 1 is rotated by a toothed pulley 6 which is keyed at 6a to one end of shaft 1. Pulley 6 is driven by a reversible motor 7a through a reduction gear 7b and a toothed belt 7c.

Drive unit A has a first pneumatically controlled and operated clutch 8a connected to the frame E, which can be engaged with a cylindrical drum 9 keyed at 9a to the support casing 3. A second pneumatically and operated clutch 8b is attached to the toothed pulley 6, i.e., the main shaft 1. Clutch 8b can also engage drum 9. The combination of these two clutches permits the tire-building drum B to be driven either in rotating motion or in a radial expansion or contraction motion, as will be explained below.

The tire-building drum B includes two end sections $B_1$ and $B_2$ and a central section $B_3$. End sections $B_1$ and $B_2$ can be axially moved, with respect to center section $B_3$, toward each other or away from each other in the direction of the axis of shaft 1. End sections $B_1$ and $B_2$ can also be expanded radially simultaneously so as to increase the overall diameter of the drum. End section $B_1$ comprises two axially spaced transverse plates 70a and 71a to which a plurality of longitudinal guide rods 12a (of which only two are shown) are attached by fastening means 200a. Transverse plates 70a and 71a of end section $B_1$ are mounted on bearings 72a and 73a. Bearings 72a and 73a are in surrounding contact with the unthreaded surfaces 74b of a threaded sleeve 74a. End section $B_2$ comprises two axially spaced transverse plates 70b and 71b to which a plurality of longitudinal guide rods 12b (of which only two are shown) are attached by fastening means 200b. Transverse plates 70b and 71b of end section $B_2$ are mounted on bearings 72b and 73b. Bearings 72b and 73b are in surrounding contact with unthreaded surfaces 74c of a threaded sleeve 74d. The periphery of sleeves 74a and 74d have two oppositely pitched threads 74e and 74f. Sleeves 74a and 74d are keyed to shaft 1 and rotate together with main shaft 1. Nuts 75a and 75b are threaded onto threaded portions 74e and nuts 76a and 76b are threaded onto threaded portions 74f. Nuts 75a and 75b are in contact with respective transverse plates 70a and 71a and nuts 76a and 76b are in contact with respective transverse plates 70b and 71b. A plurality of radially expandable segments 77a and 77b are disposed about the circumferential periphery of each end section $B_1$ and $B_2$. Each of the segments 77a and 77b is respectively pivotably joined at O and O', by links 77c and 77d and 79a and 79b. Links 79a and 79b are pivotably joined, at P and P', respectively, to nuts 75a and 75b and 76a and 76b. Each joint P and P' is disposed in a respective journal 201 and 201a located on nuts 75a, 75b, 76a and 76b. Axial movement of nuts 75a, 75b, 76a and 76b causes links 79a and 79b to pivot at O and O' and P and P' and radially moves links 77c and 77d and thereby radially move segments 77a and 77b. Segments 77a and 77B are guided by radial slots (not shown) in transverse plates 70a, 71a and 71a and 71b. Transverse plates 71a and 71b include apertures such as at 71c and 71d through which rods 12a can freely pass for eventual connection to drive unit A. Rods 12a prevent the rotation of nuts 75a and 76 a of end section $B_1$, whereas both rods 12a and rods 12b prevent the rotation of similarly located nuts 75b and 76b of end piece $B_2$. A flexible and deformable elastomeric membrane or bladder 78 covers the periphery of the center section $B_3$ of the tire-building drum B. The extreme marginal ends 78c and 78d of membrane 78 are formed into beads which are fixedly and sealably attached to the inside of annular bead receiving grooves 78a and 78b on each of end sections $B_1$ and $B_2$. A plurality of circumferentially arranged pairs of pivotable arms 79 are journaled at one end to radial slots (not shown) in transverse plates 71a and 71b and are joined at a pivoting connection 79c. Pivotable arms 79 are located between end sections $B_1$ and $B_2$ and forms the center cylindrical drum section $B_3$. In the position shown in FIG. 2b, the cylindrical inner surface of membrane 78 is rigidly supported by the peripheral cylindrical surface formed by arms 79. Axially inward movement of nuts 75a, 75b, 76a and 76b causes arms 79 to rotate in the journal on transverse plates 71a and 71b and pivot at connection 79b, thereby permitting axial contraction of tire-building drum B. Radial expansion and axial contraction of tire-building drum B is controlled by the operating conditions of pneumatic clutches 8a and 8b. When second pneumatic clutch 8b is engaged with drum 9 and toothed pulley 6, and when first pneumatic clutch 8a is disengaged from drum 9, shaft 1, support casing 3, and rods 12a and 12b, can be rotated together by motor 7a. Rotation of support casing 3 causes rotation of rods 11a and 11b and thereby rods 12a and 12b, as described below. Rotation of building-drum B is thereby effected without radial expansion or axial contraction. Rotation of drum B in this manner permits the various carcass plies and other tire building components to be applied to the drum.

In contrast, when clutch 8a is engaged with drum 9 and when clutch 8b is disengaged from drum 9 and pulley 6, motor 7a produces rotation of the main shaft 1, without rotating the support casing 3 and rods 12a and 12b. Support casing 3 is then stationary with respect to frame E of drive unit A. Rotation of main shaft 1 and, consequently, threaded sleeves 74a and 74d, produces reciprocal axial movement of nuts 75a, 75b, 76a and 76b accoring to the direction of rotation imparted to shaft 1 by motor 7a. As shaft 1 rotates in a given direction, sleeves 74a and 74d cause nuts 75a and 76a, as well as nuts 75b and 76b, to axially move away or toward each other and consequently, cause radial contraction or radial expansion, respectively, of the tire-building drum B. An axially and radially expandable and contractible tire building drum suitable for use with this invention is described in U.S. Pat. No. 3,718,520 and assigned to the assignee of the present invention.

Drum unit A also controls and actuates the axial expansion and contraction of the tire-building drum B by the axial displacements in opposite directions of rods 12a and rods 12b. Each of the rods 12a and 12b are connected through couplings 13 and 13a to a similar plurality of rods 11a and 11b, respectively. Rods 11a are further connected to a sliding plate 80a by fastening means 202. Rods 11b freely pass through aperture 203 in sliding sleeve 80b, and is connected to sleeve 80b by fastening means 204. Longitudinal rods 10a are connected at one end to sleeve 80b by fastening means 206. Rod 10a freely passes through aperture 207 in sleeve 80b. Rods 10a and 10b further freely pass through substantially friction free rings 81, which are supported by transverse guide plates 82. The other end of rods 10a freely passes through the housing of bearing 4a and is attached by means 208 to transverse plate 22a. The other end of rods 10b freely passes through the housing of bearing 4a and is attached by means 209 to transverse plate 22b. Transverse plates 22a and 22b can slide longitudinally on casing 3 and therefore axially relative to shaft 1. Transverse plates 22a and 22b are respectively supported through bearings, 23a and 23b, within support 21a and 21b. Each support 21a and 21b has three radially disposed nuts arranged 120° apart from each other, such as nut 20a for support 21a and nut 20b for support 21a. Nuts 20a and 20b are internally threaded, the threads of nuts 20a having a pitch opposite to that of nuts 20b. Screws 19a, having opposite pitch threads 19b and 19c is threaded onto nuts 20a and 20b, the threads 19b being the same pitch as the threads of nut 20a and the threads 19c being the same pitch as the threads of nut 20b. One end of screws 19a is supported by frame E through bearings 83a and the other end of screws 19a is supported by bearing 83b. The end of screws 19a supported by bearing 83b is connected by means 208 to keyed pinions 18. Pinions 18 are rotated by a reversible motor 14, which is supported by the frame E, through the following drive mechanisms. Motor 14, through a belt drive, drives a worm screw 15. Screw 15 rotates a first cog wheel 16 the cogs of which rotate a second cog wheel 17. Cog wheel 17 rotates on bearing 209 and the cogs engage at 210 with the three pinions 18. Motor 14 causes pinions 18 to rotate and thereby screws 19a to rotate. According to the direction of rotation of motor 14 nuts 20a and 20b reciprocally advance toward or away from each other, and consequently, impart a similar axial motion to rods 12a and 12b. Axial motion of rods 12a and 12b accomplishes a reciprocal approach or a reciprocal separation of end sections $B_1$ and $B_2$ of the drum B, i.e., axial contraction or axial expansion of drum. The axial contraction or axial expansion of drum B does not effect the symmetrical structure of the tire-building drum relative to its median transverse plane 211, which remains fixed. The motions of the different rods are strictly synchronized because of the nature of the drive employed by the motor 14.

The axial limit of drum contraction and the axial limit of drum expansion is controlled by the action of two cam stops 84a and 85a attached to support 21a. Cam stop 84a is threaded onto one of screws 19a and its position on this screw can be varied. Cam stops 84a and 84b respectively engage limit contacts 24a and 24b. Limit contact 24a extends from and is attached to a circumferential position on support 21a immediately adjacent to or forms part of one of the nuts 20a. The position of limit contact 24b can be adjusted by means of crank means 86 to permit regulation of the axial contraction of the tire-building drum as a function of the distance that should exist between the two bead wires 99 (FIG. 3a) during the shaping of the carcass into the toroidal configuration. Guide rods 212 are attached at respective ends to the crank 86 and to the support 21a. Extending between crank 86 and support 21a is a threaded rod 213. One end of rod 213 is fixed to crank 86 and the other end is journaled for rotation in support 21a. Limit contact 24b is attached to a support 214 whereby support 214 slides on rods 212 and has a threaded aperture engaging threaded rod 213. Rotation of crank 86 adjusts the location of support 214 on threaded rod 213. Monitoring or detecting means, mechanical or electrical can be associated with stops 84a, 85a and limit contacts 24a, 24b.

Radial expansion and contraction of tire-building drum B is monitored by detecting the angle of rotation of the main shaft 1 relative to the support casing 3. Monitoring is accomplished by cams 25a and 25b which engage limit contacts 26a and 26b, respectively, which contacts are supported by double arm 218 of frame E. Cams 25a and 25b are not directly attached to rotating components, i.e., support casing 3 and main shaft 1, but to an auxilliary mechanism whose movement is strictly synchronized with the radial movement of expandable components, such as segments 77a of the tire-building drum. The auxilliary mechanism comprises a movable cam-holder rod 31 supporting cams 25a and 25b which respond to the differential rotation between the casing 3 and the main shaft 1. Cam-holder rod 31 is attached by brackets 215 and 216 to a further rod 30. Rods 30 and 31 are parallel to each other and simultaneously rotate about their respective longitudinal axes. Rod 30 includes threaded portion 30a that engages with a threaded sleeve 28, and an external longitudinally extending grooved portion 30b that engages with the complementary internal grooves of a sleeve 29. Grooved portion 30b rotates with sleeve 29. Sleeve 29 forms the inner cage of a bearing 29a. Sleeve 28 forms the inner cage of a bearing 28a. A pulley 27a is attached by flange 217 to drum 9 and a pulley 27c is attached to sleeve 28. Threaded sleeve 28 is rotated together with the support casing 3 by belt 27a' and pulleys 27a and 27c. Pulley 27B is rigidly part of toothed pulley 6, and pulley 27d is attached to sleeve 29. Grooved sleeve 29 is rotated together with toothed pulley 6, by belt 27b' and pulleys 27b and 27d. The gear-reduction ratios of the pulley-belt combinations 27a, 27a', 27c and 27 b, 27b', 27d and 6 are identical, so that axial displacement of rod 30 relative to threaded sleeve 28 is proportional to the differential rotation of the main shaft 1 and the support casing 3. Threaded sleeve 28 and grooved sleeve 29 cannot move axially because the outer cages of bearings 28a and 29a is attached to frame E.

This auxiliary mechanism thus makes it possible to accurately monitor the radial position of the expandable components of the tire-building drum, although the monitoring means are not located directly on the drum.

The position of cam 25a on rod 31 is adjustable by crank 87 located at one end of cam-holder rod 31. Portion 31a of rod 31 is threaded and engages with the inner thread of cam 25a. Cam 25a is permitted to rotate by two rollers 88. Rollers 88 are mounted above and below cam 25a on a flange 89. Flange 89 is parallel to rod 31 and is part of arm 218.

In addition to limit contacts 26a and 26b, further limit contacts (which is not represented) monitor the condition of radial expansion or contraction of the tire-building drum B to determine the exact moment when, during radial expansion, the bead wires come into contact with the flat carcass layers. This further limit contact actuates the bead wire gripping apparatus 100 into axial movement. The axial movement of apparatus 100 is such that bead wires 99 always occupy a position whereby the point of initial contact of the bead wire with the flat carccass carcas layers follows a regular path until complete positioning of the bead wires is annual grooves 78a and 78b. This movement avoids any tension or folds in the flat carcass layers. Reference is made to the above copending application Ser. No. 265,876 for a better understanding of the axial movement of gripping apparatus 100.

Pneumatic pressure is connected to a revolving joint 32, which supplies, through an axial bore 90 in shaft 1, a second revolving joint 33. Collapsible pipelines 90a, extend from joint 33 to an axial duct 11b' in rods 11b. Rod 33a, attached to the housing of joint, slides in aperture 207a of sleeve 80b. Rod 33a permits the axial movement of joint 33 and the simultaneous rotation of joint 33 with sleeve 80b. Pneumatic pressure then directed through couplings 13 and 13a into an axial duct 12b' in rods 12b. Pneumatic pressure is then directed into the space between the membrane 78 and the inner surface of the carcass, by means of appropriate flexible tubing schematically represented by 90b. The pneumatic pressure exists from tubing 90b at apertures 90c in membrane 78. In FIGS. 1b and 2b it is to be understood that the carcass which is built on the drum B, particularly the center section $B_3$, is not shown.

Drive unit A includes a shaping ring-holder which serves as a general support for the means of shaping the right side of the carcass, as viewed in FIGS. 1b and 2b. The shaping ring-holder comprises an inner cylindrical ring 91, a middle cylindrical ring 92, and an outer cylindrical ring 93, each ring being coaxial with shaft 1. A ring-carrier 135, having a cylindrical extension 35, is slide-mounted on a support tube 34 which is part of frame E. The sliding motion of ring-carrier 135 is provided by two jacks, 43a and 43b, having a cylinder 43c and 43d connected to support rings 219 and 220 on frame E and a piston 43e and 43f connected to ring-carrier 135. Pistons 43e and 43f freely slide through apertures in support ring 219. Displacement of ring-carrier 135 in a direction parallel to shaft 1 also axially displaces each of the rings 91, 92 and 93. Two rods 44a and 44b, that slide in apertures in rings 219 and 220, cooperate with pistons 43e and 43f in preventing ring-carrier 135 from revolving about shaft 1.

Extending axially from inner ring 91 is a ring support 36 which is supported by cylindrical extension 35 by two roller bearings 94a, 94b. Bearings 94a and 94b allow inner ring 91 to rotate about shaft 1 and relative to ring-carrier 135. Circumferentially disposed about the periphery of inner ring 91 is an expandable bladder 41 which provides the positioning of the sidewalls 106 on the carcass in the final state of the method of this invention (see FIGS. 3a to 3f). Pneumatic pressure for inflating bladder 41 is provided in the following manner. Annular inflatable gaskets 42a and 42b are disposed about the periphery of ring 91 and further prevent the rotation of ring 91. The annular chamber 95 bounded by the ferrule 36, the cylindrical extension 35, and gaskets 42a and 42b is then pressurized by ducts, which are not represented. Ducts (not shown) are drilled in ring support 36 and in ring 91 to permit the pneumatic pressure in chamber 95 to inflate bladder 41 through apertures 41a (FIG. 3f).

A pressing ring 40 is attached to the inner periphery of a flange 91a of ring 91 and is axially slidable thereon. The normal position of pressure ring 40 is to the left as viewed in FIGS. 1 and 2. The normal position is secured by pressure springs 40a whose force is sufficient to overcome the force exerted by the springs 96a attached to lugs 96 of the tirebuilding drum (see FIGS. 3c to 3d). The purpose of lug 96 is to actuate pusher rod 96b in order to compress the beads 99 after the initial turnup of the layers of the carcass. Pusher rod 96b cooperates with inner ring 91 and middle ring 92 in turning and applying the carcass ply about the bead 99. Pressure ring 40 pushes lugs 96 axially inward toward the transverse median plane 211 of the drum before inner ring 91 can come into contact with the carcass. Lugs 96 enables the completion of the carcass ply turnup and maintains an impermeable seal between bead 99 and the grooves 78a and 78b during inflation of the carcass and the shaping by inner ring 91, middle ring 92 and outer ring 93. Lugs 96 and pusher rod 96a, as actuated by pressure ring 40 and springs 40a, thus prevents any folding or irregularities in the carcass ply during final turning of the carcass ply around the beads, which folding or irregularly could result from the effect of the axial thrust of the inner ring 91. Reference is made to FIGS. 3a to 3f and the accompanying specification for a more detailed description.

Middle ring 92 is attached to a cylindrical ferrule 38 and 38a that rotates on two bearings, 97a and 97b, on a ring support 37. Middle ring 92 can therefore freely rotate relative to the ring-carrier 135. The rotating movement of inner ring 91 and middle 92 ring is necessary during the application of the reinforcing belt and the tread onto the carcass as will be described with respect to FIGS. 3a to 3f. The outer ring 93 does not rotate as it is supported by cylindrical ferrule 39 and a ring support 39a.

The longitudinal or axial movement of the middle ring 92 and the outer ring 93 is directly controlled by jacks 45a and 45b and 46a and 46b attached to ring-carrier 135. Two jacks, 45a and 45b, axially move ring support 37, and control the movement of middle ring 92. The movement of middle ring 92 is guided by sliding rods 47a and 47b, which are connected at one end to ring support 37 and at the other end pass through apertures in rings 219 and 220. Guide rods 47a and 47b prevent rotation of ring support 37, but does not prevent rotation of middle ring 92 because of bearing 97a and 97b. Two jacks, 46a and 46b, axially move ring support 39a and control the axial movement of outer ring 93 relative to the ring carrier 135. Axial movement of outer ring 93 is guided by two rods 48a and 48b, that slide in apertures in rings 219 and 220 at one end and the other end is connected to ring support 39a. Inner ring 91 is axially moved by the axial movement of middle ring 92. In the annular space bounded by ferrule 38a, bladder 41, ring supports 36 and 37, is an annular angle member 221. One flange 221a of member 221 is located between bearing 97a and an end of ferrule 38a. Another flange 221b of member 221 is located in the annular space between the axially inward end 37a of ring support 37 and the axially outward end of inner ring 91. As ring support 37 axially moves, end 37a abuts against flange 221b and axially moves member 221. Axial movement of flange 221b continues until it abuts against the axially outward end of ring 91. Continued axial movement of member 221 by ring support 37 will therefore axially move inner ring 91 and middle ring 92.

Guide rods 47a, 47b, 48a, and 48b include means which acts as physical stops for limiting the axial movement of middle ring 92 and outer ring 93 by limiting the strokes of jacks 45a, 45b, 46a and 46b. The stop positions of guide rods 47a, 47b, 48a and 48b are located such at rings 92 and 93 are placed in predetermined positions relative to ring 91, so as to obtain the exact profile desired for the carcass during the shaping operation (see FIG. 3d). A detachable stop 222 having a bracket 222a controlled by a jack 222b is mounted on a rail 223 which is attached to ring 220. Bracket 222a and jack 222b engaged guide rods 47a, 47b, 48a and 48b and thereby limit the strokes of jacks 45a, 45b, 46a and 46b. The strokes of jacks 45a, 45b, 46a and 46b are limited to values such that middle ring 92 and outer 93 ring are effectively able to adjust to the inflation of bladder 41 during placement of the sidewalls onto the carcass (see FIG. 3f). The length of the strokes is adjustable by varying the position of stop 222 along rail 223. The mechanical unit C comprises a carriage 49 that supports a counterpoint support and shipping unit D. Unit D comprises the counterpoint support 61 and the carcass-shaping means for the left side of the carcass, as viewed in FIGS. 1 and 2. Carriage 49 is displaceable in a linear direction perpendicular to the main shaft 1. The displacement of carriage 49 is guided by horizontal-shaft rollers 51a, 51b and vertical shaft rollers 51c, which roll on rails attached to the inside of two I-bars 50a and 50b. The displacement of carriage 49 is accomplished by a two-speed motor 54 that drives shaft 53 through a transmission that includes reduction gear 55 and a belt 55b. Two pinion gears 52a and 52b, which are keyed to shaft 53, engage with respective racks (which are not represented attached to the inside of I-bars 50a and 50b. The two speeds of drive motor 54 correspond to a rapid speed for displacing the carriage 49 such that the counterpoint support and shaping unit D is in proximity with tire-building drum B, and a slower speed for accurate positioning of the carriage 49 and unit D.

FIGS. 1 and 2 disclose that unit D extends from carriage 49 and tire-building drum B extends from drive unit A. Proper operation of the invention requires accurate centering and positioning of unit D relative to and engagement with the portion 1a of main shaft 1. The cross-section of counterpoint 61 and hollow shaft and 1a is non-circular to permit rotation of unit D by shaft 1. Carriage 49 is displaced by motor 54 whereby counterpoint 61 engages within the hollow end 1a of the main shaft 1. In order to ensure accurate centering and engagement of position of counterpoint 61 is accurately monitored taking into consideration that unit D extends from carriage 49. Accurate centering of carriage 49 and counterpoint 61 is monitored in two axes. A first axis is perpendicular to the direction of displacement of carriage 49 and is therefore parallel to axis F of shaft 1. A second axis is parallel to the direction of displacement of carriage 49 and is therefore perpendicular to axis F of shaft 1. Mechanical unit C is provided with a centering pin 56 which is oriented along an axis $F_1$ and perpendicular to the direction of displacement of carriage 49 and parallel to axis F of shaft 1. Pin 56 is driven by a jack 57 into engagement with centering units 58a and 58b located on frame E, depending on the position of the carriage 49. Centering units 58a and 58b each include inlet bores 58c and 58d for receiving pin 56. Centering unit 58a is located on frame E in a position such that engagement of pin 56 with inlet bore 58c corresponds to the accurate positioning and engagement of counterpoint 61 in hollow shaft end 1a. Centering unit 58b is located in a remote position on frame E such that engagement of pin 56 with inlet bore 58d will lock the carriage 49 and prevent further displacement. The lock position of carriage 49 permits the placement of the bead wires 99 onto the gripping means 100, the positioning of the belt and tread circumferential about drum B and the removal of the completed carcass from drum B.

Mechanical unit C is provided with two pins oriented along an axis $F_2$ parallel to the direction of displacement of carriage 49 and perpendicular to axis F of shaft 1. Pin 59b engages with an inlet bore 60c of a centering unit 60b located on frame E. Pin 59a engages with an inlet bore 60a of a centering unit 60a located on frame E. The cross-sectional shape of each of the pins 56, 57, 59a and 59b and the inlet bores 58c, 58d, 60c and 60d may be conically shaped or have any other shape which will tend to encourage self-centering. Accurate positioning of unit D in a direction perpendicular to the main shaft is therefore achieved by centering pin 56, whereas centering pins 59a and 59b permit accurate transverse and vertical centering of the unit D.

Counterpoint 61 is supported on a shaft 62 by two bearings, 61a and 61b, mounted within a collar 62a. Shaft 62 is an extension of a piston 63 of a dual-action ring jack having two chambers, 64a and 64b. Guide rod 65 is attached at one end to a flange 62b extending from collar 62 and the other end slides in a bushing 63b attached to the support casing 34 of unit D. Guide rod 65 prevents rotation of shaft 62 during actuation of piston 63. Fluid pressure for actuation of piston 63, either axial away from or axially toward the building drum B, is provided by conduits 63c which have inlets in cylinder 63a on either side of piston 63. After accurate positioning of mechanical unit C, the actuation of the ring jack permits the end of counterpoint 61 to be inserted into the hollowed end 1a of main shaft 1.

The means for shaping the left side of the carcass as viewed in FIGS. 1 and 2, which is supported by unit D, has a structure that is quite similar to the corresponding means supported by drive unit A and corresponding elements have the same reference numerals except for the prime characterization. These means include, in part, a ring-carrier 135' having a cylindrical extension 35' which can slide axially over the support tube 34' attached to the carriage 49, whereby ring carrier 135' in turn supports, by means of ferrules, ring supports, cylindrical extensions and bearings, an inner ring 91' that supports the inflatable bladder 41', a middle ring 92', and an outer ring 93'. In addition, sliding motion of ring carrier 135' is provided by jacks 43'a and 43'b connected to ring supports 219' and 220' on carriage 49. Displacement of ring carrier 135' in a direction parallel to shaft 1 also axially displaces each of the rings 91', 92' and 93'. Guide rods, 44'a and 44'b, cooperate in preventing ring-carrier 135' from revolving about shaft 1. Pneumatic pressure for inflating bladder 41' is provided by inflating gaskets 42'a and 42'b. Annular chamber 95' is pressurized by ducts (not shown). Ducts (not shown) are drilled in ring support 36' is in ring 91' to admit pneumatic pressure into chamber 95' so as to inflate bladder 41' through apertures 41'a. A pressing ring 40', including pressure springs 40'a, acts against lugs 96 and pushes rod 96a to assist in the turning of the carcass ply around bead wire 99. Longitudinal or axial movement of middle ring 92' and outer ring 93' is provided by jacks 45'a and 45'b and 46'a and 46'b. The movement of middle ring 92' is guided by sliding rods 47'a and 47'b and that of outer ring 93' by guide rods 48'a and 48'b. Annular flange 221' cooperates with middle ring 92' in axially moving inner ring 91'. Physical stops 222' limit the axial movement of middle ring 92' and outer ring 93'.

The method of this invention, including the operative steps of the preferred embodiment described in FIGS. 1 and 2 will be better understood by referring to FIGS. 3a to 3f. FIGS. 3a to 3f disclose only a portion of the apparatus of FIGS. 1 and 2, and in particular, illustrate a partial cross-section of unit D associated with the shaping of the left side of the carcass as viewed in FIGS. 1 and 2. As can be seen from FIGS. 1 and 2, end section $B_1$, as shown in FIGS. 3a to 3f, does not have all the elements associated with the radial and axial expansion and contraction of the drum B nor the type of connection between the drive unit A and the radially movable segments of the drum. The operative steps described in FIGS. 3a to 3f are also the operative steps performed on the right side of the carcass except for the movements associated with carriage 49 and counterpoint 61.

Figure 3A:
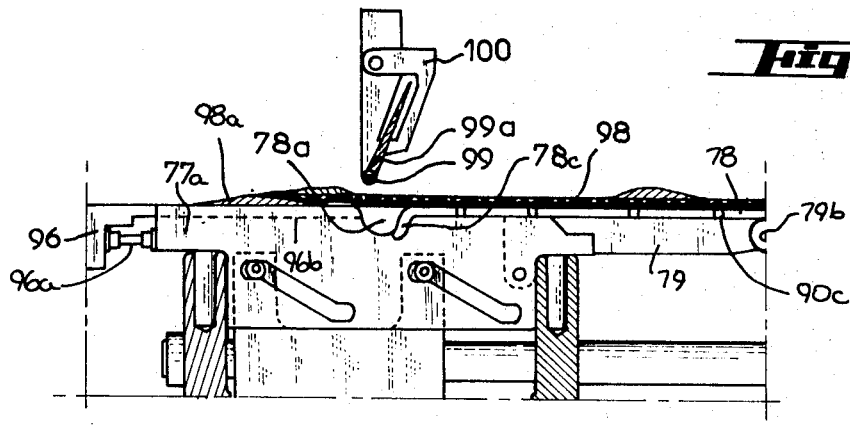

The tire-building drum B shown in FIG. 3a is in the radially contracted and axially expanded position. Carcass layer 98 have been applied in the flat condition and circumferentially of the membrane 78. The marginal edge 98a of the carcass layers extend over bead receiving groove 78a. Lugs 96 are biased by spring 96a into the axially expanded position. A bead wire ring 99, which may include an apex or filler strip 99a, is positioned by apparatus 100 adjacent to the groove 78a. The bead wire ring is positioned coaxial with the tire-building drum and radially spaced from the carcass layers on the drum. The bead wire ring is also disposed slightly axially outward of the groove 78a. This position and orientation of the bead wire ring corresponds to the desired final position and orientation.

Figure 3B:
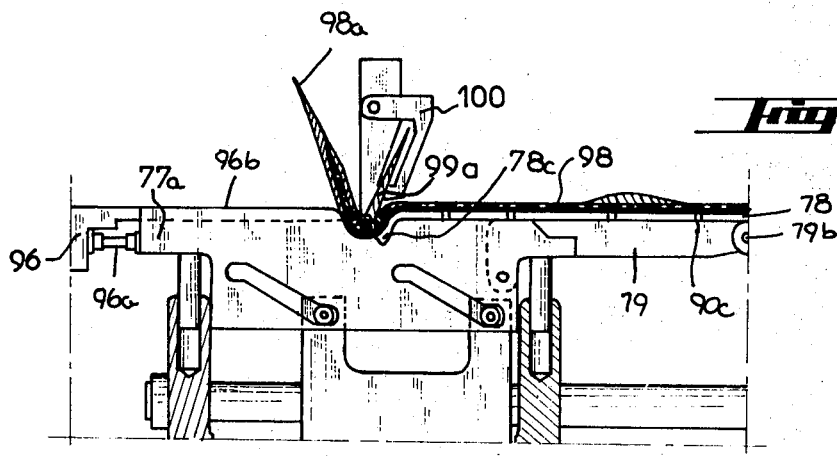
Figure 3C:
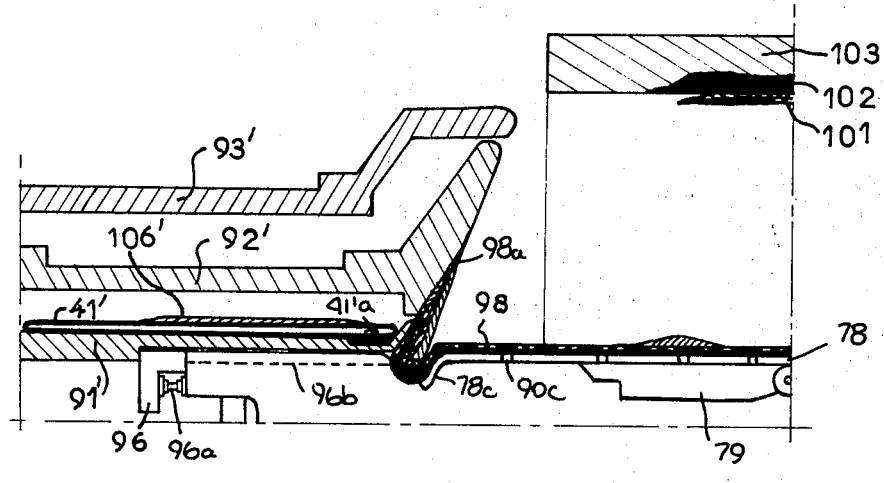
Figure 3D:
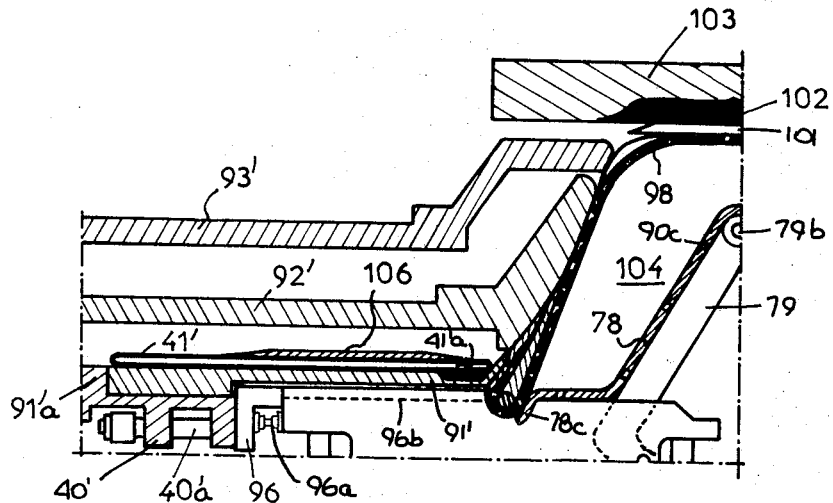
Figure 3E:
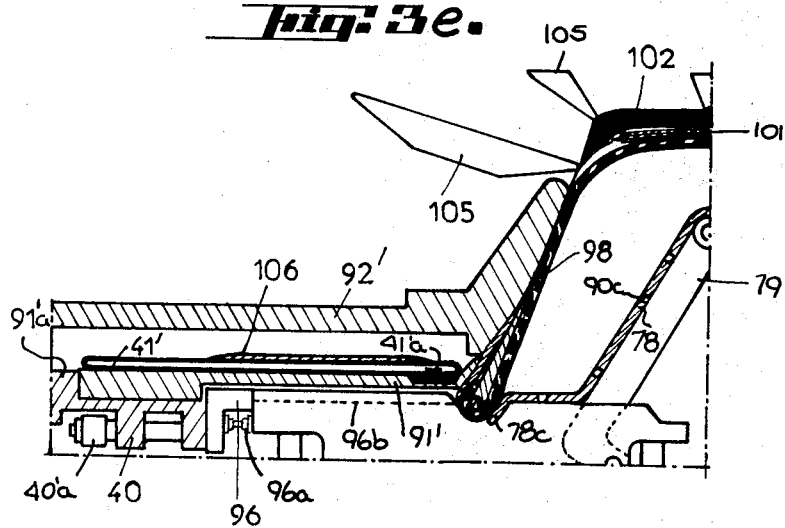
Figure 3F:
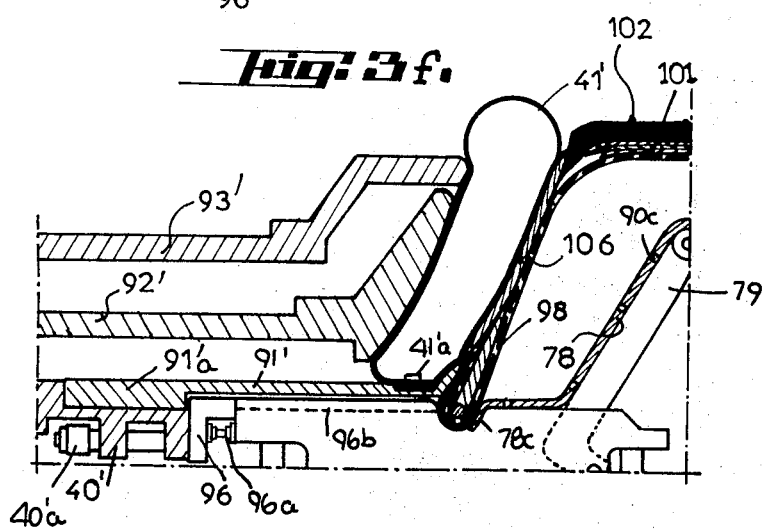

Referring to FIG. 3b, the tire-building drum is radially expanded by the radial displacement of segments 77a. Radially expanding the drum causes the bead wire ring 99 to be seated into groove 78a and embedded in the carcass layer 98. Embedding in the carcass layers caused a partial turning of the marginal edge 98a about the bead wire 99. In addition seating of the bead wire and radial expansion of the drum forms an impermeable seal between the carcass 28 and membrane bead 78c.

Inner ring 91' is axially moved together with middle ring 92' and pressing ring 40' moves lugs 96 and pusher arm 96a is actuated axially inward compressing bead 99 to ensure an impermeable seal between the carcass layers 98 and membrane bead 78c. Inner ring 91' and middle ring 92' turns the marginal edge 98a around the bead 99, whereby the layers and the inner ring 91' and the middle ring 92' are in the position represented in FIG. 3c. Disposed coaxially with drum B is a transfer ring 103 which supports a reinforcing belt 101 and a tread 102. Outer ring 93' is axially moved to the position shown in FIG. 3c in order to assist in the shaping of the carcass. The apparatus is in the position represented in FIG. 3c in preparation for the shaping of the carcass.

The tire-building drum is axially contracted and pneumatic pressure is admitted through aperture 90c into the space 104 between the inner surface of the carcass layers 98 and the membrane 78. The carcass is inflated into the toroidal configuration as determined by shaping rings 91', 92' and 93'. The apparatus is in the position represented in FIG. 3d.

Outer ring 93' is moved axially outward and the reinforcing belt 101 and tread 102 is rolled and stitched by means of rollers 105. The apparatus is in the position represented in FIG. 3e.

The inner ring 91' continues to push lugs 96 axially inward, as middle ring 92' and outer ring 93' are moved axially outward. A sidewall 106 has been previously disposed circumferentially about bladder 41'. Bladder 41' is inflated through aperture 41'a and middle rings 92' and outer rings 93' are moved axially inward and against bladder 41'. As middle ring 92' and outer ring 93' move axially inward, bladder 41' is turned. The pressure exerted by the middle ring 92' and the outer ring 93' against bladder 41' applies the sidewall 106 to the carcass 98. The apparatus is then in the position represented in FIG. 3f. Bladder 41' is then deflated, and all the shaping rings are moved axially outward, and the sidewalls may be rolled and stitched. The carcass can then be removed from the tire-building drum B by disengaging counterpoint 61 from shaft end 1a and moving carriage 49. The completed carcass is then inserted into a mold and vulcanized to form the pneumatic tire.

While we have herein shown and described the preferred embodiment of this invention and have suggested variations therein, other changes and variations may be made therein within the scope of the appended claims without departing from the spirit and scope of this invention.

What is claimed is:

1. An apparatus for manufacturing a pneumatic tire having at least a pair of bead wire rings and apex strips on a cylindrically shaped carcass, comprising,
   a radially and axially expandable and contractable tire building drum having an axis of rotation,
   a plurality of pairs of rings adjacent each end of the drum and arranged concentric and coaxial with each other and the axis of rotation of the drum,
   a first pair of the plurality of rings being movable axially inward with respect to the drum to contact a respective bead wire ring and apex strip to maintain and stabilize the ring and strip during the radial expansion of the carcass into a toroidal shape.

2. Apparatus according to claim 1 comprising a second pair of the plurality of rings being movable axially inward with respect to the drum to turn a marginal edge of the carcass around the respective bead wire ring during the radial expansion of the carcass into the toroidal shape.

3. Apparatus according to claim 1 comprising a second pair of the plurality of rings being movable axially inward with respect to the drum for shaping a respective sidewall of the tire during radial expansion of the carcass into the toroidal shape.

4. Apparatus according to claim 2 wherein said second pair of the plurality of rings being movable axially inward with respect to the drum for shaping a respective sidewall of the tire during radial expansion of the carcass into the toroidal shape.

5. Apparatus according to claim 1 comprising a drive unit having a rotatable shaft axially supporting two opposing ends of the tire building drum;
   the drive unit including means for producing radial and axial expansion and contraction of the drum;
   a mechanical unit having a rotatable support for the shaft extending from the second end of the drum;
   the drive unit having one of each pair of the plurality of pairs of rings; and
   the mechanical unit having the other of each pair of the plurality of pairs of rings.

6. An apparatus according to claim 1 comprising means for positioning a reinforcing belt and tread coaxially with the building drum and circumferentially about the periphery of the carcass,
   the toroidal shaping causing the carcass to radially expand into contact with the belt and tread.

7. Apparatus according to claim 5 wherein the means for radially expanding the drum includes means for applying pneumatic pressure between the periphery of the building drum and a carcass on the drum periphery.

8. Apparatus according to claim 5 wherein the mechanical unit comprises a movable carriage,
   said carriage including means for centering the rotatable support along first axis parallel to the rotation axis of the building drum and perpendicular to the direction of movement of the carriage and means for aligning the carriage along a second axis perpendicular to the drum rotation axis and parallel to the direction of movement of the carriage.

9. Apparatus according to claim 5 comprising means for disengaging said mechanical unit rotatable support from the shaft,
   said disengagement means comprising a jack for moving said support coaxially with the shaft axis.

10. An apparatus according to claim 1 wherein the plurality of rings includes means for applying sidewalls to each side of the tire.

11. Apparatus according to claim 5 wherein the means for radial and axial expansion and contraction of the building drum comprises a sleeve in each end section of the drum;
    said sleeve having peripheral threads of opposite pitch and being coaxial and rotatable with the shaft;
    a nut disposed on each of the threads of opposite pitch, each nut being axially slidable on a respective set of said rods, each of said nuts having pivotably connected thereto radially expandable drum segments.

12. An apparatus according to claim 5 wherein the drive unit includes a rotatable support casing, said casing being coaxial with and supporting the shaft;

said means for producing radial and axial expansion and contraction of the building drum comprising two sets of longitudinal rods extending coaxially with the shaft and rotatable with said casing;

one set of rods being movable in an axial direction opposite to and simultaneous with the other set of rods;

said one set of rods being connected to a first end section of the drum and said second set of rods being connected to a second end section of the drum, and means for rotating the shaft and the casing together and means for rotating the shaft without rotating the support casing.

13. Apparatus according to claim 12 wherein the means for rotating the shaft and the casing comprises a first and second clutch and a reversible motor means connected to the shaft;

said first clutch being engageable with said support casing and said second clutch being engageable with the shaft and the support casing; such that actuation of said second clutch a disengagement of the first clutch rotates the support casing, the shaft, said sets of rods and the building drum without effecting radial or axial expansion or contraction of the drum and such that actuation of the first clutch and disengagement of the second clutch rotates the shaft, said sets of rods and the building drum thereby effecting radial and axial expansion and contraction.

14. Apparatus according to claim 12 comprising means for axially displacing said sets of rods said means comprising two axially spaced plates oriented transverse to and axially slidable on the support casing, one set of rods being connected to one of said plates, said second set of rods being connected to the second plate;

each of said plates having a threaded nut, the threads being of opposite pitch; and a screw having threaded portions engaging with the nut threads.

15. Apparatus according to claim 5 comprising means for, by detecting the relative angular rotation between the shaft and a support casing, said detecting means comprising two cams;

limit contacts which engage said cams, said limit contacts being stationary and located on said drive unit, said cams being axially movable on means synchronously rotatable with the shaft and radially expandable drum segments.

16. Apparatus according to claim 15 wherein the synchrously rotatable means comprises a camholder rod for support of the cams;

an axially movable rod parallel to the camholder, said camholder and movable rod being connected together;

said movable rod having a threaded screw portion and an external longitudinally extending grooved portion;

a threaded sleeve engaging the threaded portion of the movable rod;

an internally grooved sleeve engaging the groove portion of the movable rod;

means for rotatably connecting the threaded sleeve to the support casing and means for rotatably connecting the grooved sleeve to the shaft;

whereby axial displacement of the movable rod relative to the threaded sleeve is proportional to the differential rotation of the shaft and the support casing.

17. Apparatus according to claim 1 wherein the plurality of pairs of rings comprises an inner ring, a middle ring and an outer ring, said inner ring being said first pair of rings, said inner, middle and outer rings being attached to an axially movable ring carrier; and means of axially moving said plurality of rings.

18. Apparatus according to claim 17 wherein the middle ring pair being movable axially inward with respect to the drum to turn a marginal edge of the carcass around the respective bead wire ring during the radial expansion of the carcass into the toroidal shape.

19. Apparatus according to claim 18 wherein the middle and outer ring pairs being axially movable inward with respect to the drum for shaping a respective sidewall of the tire during radial expansion of the carcass into the toroidal shape.

20. Apparatus according to claim 17 comprising a movable cylindrical inner ring support being connected to the inner ring said ring support being coaxial and rotatable with said shaft, an annular inflatable gasket disposed in the annular chamber between the inner ring support and the ring carrier, said gasket upon inflation preventing the inner ring from rotating.

21. Apparatus according to claim 17 wherein an inflatable bladder is annular disposed on the periphery of the inner ring, said bladder, upon inflation, applying a sidewall to the carcass, said middle and outer rings exerting pressure upon said inflated bladder.

22. Apparatus according to claim 17 wherein the middle ring is connected to a movable cylindrical middle ring support, said ring support being coaxial with and rotatable about said shaft, means located in an annular space between the inner and middle ring for axially moving the inner ring when the middle ring is axially moved.

23. Apparatus according to claim 17 wherein said means for axially moving said plurality of pairs of rings comprises a jack connected to the middle ring, said middle ring being operative to axially move the inner ring, and a jack connected to the outer ring.

24. Apparatus according to claim 23 wherein the axial movement of the jacks are limited by adjustable stop means.

* * * * *